Patented Apr. 7, 1925.

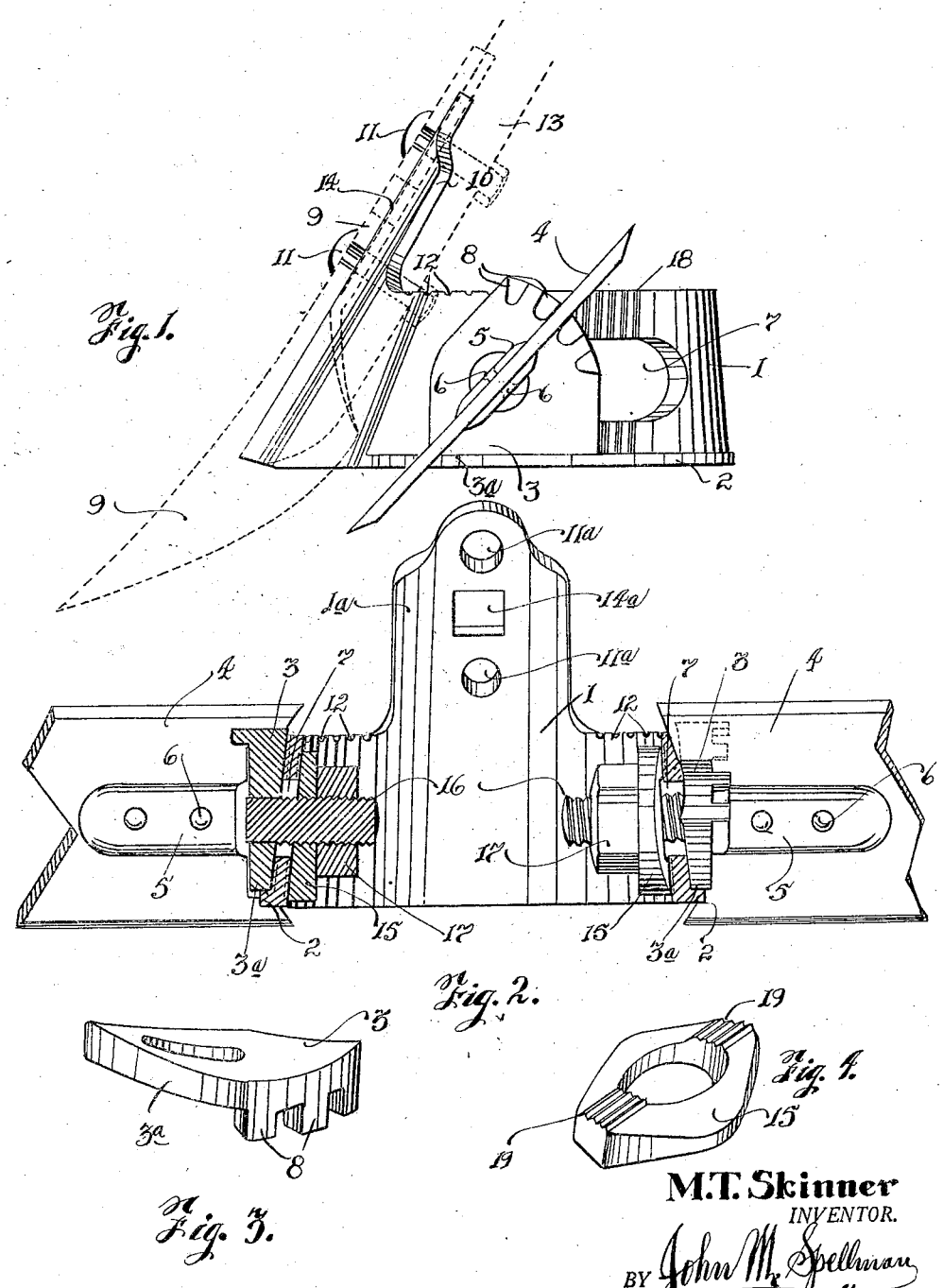

1,532,556

UNITED STATES PATENT OFFICE.

M. T. SKINNER, OF CLEBURNE, TEXAS, ASSIGNOR TO SKINNER HORSE-HOOF COMBINATION SWEEP CO., A CORPORATION OF DELAWARE.

WING-SWEEP ATTACHMENT FOR PLOWS.

Application filed May 31, 1924. Serial No. 716,953.

*To all whom it may concern:*

Be it known that I, M. T. SKINNER, a citizen of the United States, residing at Cleburne, in the county of Johnson and State of Texas, have invented certain new and useful Improvements in Wing-Sweep Attachments for Plows, of which the following is a specification.

This invention relates to agricultural implements and refers more particularly to plows.

The principal object of the invention is to provide a wing sweep attachment for plows, permitting such wings or blades to enter the soil at a desired angle to cut vegetation and cultivate the soil uniformly, said wing sweep attachment being so conformed as to insure perfect and rigid locking of the blades against movement from the desired angle.

Another object of the invention is the provision of a tongue of such shape and formation as will permit it to conformably receive a plow foot to prevent lateral play.

A feature of the invention is also the simplicity and durability of construction.

Another feature is the interchangeable blades.

Further objects and advantages of the invention will be more clearly understood by reference to the accompanying drawings wherein:—

Figure 1 is a side elevational view of the invention.

Figure 2 is a rear elevational view partly in section.

Figure 3 is a perspective view of the blade adjusting washer.

Figure 4 is a perspective view of the interior spacing washer.

Following the figures, the hoof or collar 1 has at its lower edge an annular rib 2. A washer 3 conformably shaped to the outer periphery of the hoof member has a straight edge 3ª which is adapted to lie upon this rib.

The cutting blades 4—4 are riveted to the split blade shank 5 by rivets 6—6. This shank passes through slot 7 in the hoof member and the threaded end 16 thereof is engaged by a suitable nut 17, the latter being drawn up against the spacing washer 15. This washer has vertical grooves 19—19, see Figure 4, adapted to interlock with vertical grooves in the interior of the hoof (not shown). The washer 3 has lugs 8—8 which are adapted to hold the blade rigid in relation to the washer.

Marker slots or notches 12—12 in the top of the hoof designate the points to which the blade and washer may be moved to be equally spaced on either side of the hoof. The blade and washers may thus be moved to the desired point in slot 7, and then drawn down firmly at the desired angle by nuts 17—17.

In the forward portion of the hoof a tongue 1ª extends upwardly in line with the hoof line. This tongue is curved to fit conformably to the plow foot 9, the aperture 14, on the tongue of the plow share, fitting over the aperture 14ª on the tongue of the hoof and bolts 11—11 secure the tongue and share onto the eye beam 13 of the plow, cultivator shank or foot piece.

In operation, to set the blades at the desired angle, the blade shanks are turned and fitted between the lugs in the washer, then the threaded ends are inserted through the slots in the hoof and drawn down over the spacing washers on the interior of the hoof.

From the description given, it may readily be seen how rigid the blades will become when assembled in the desired position and the nuts tightened.

Minor changes in the shape and construction of the various members may be made without departing from the spirit and intent of the invention as set forth in the following claims:

1. A wing sweep attachment for plows having a circular hoof shaped band with a tongue portion, the collar projecting upwardly and inwardly in an oblique line to the band; said tongue portion laterally curved on a line with the annular shape of the band to provide an interiorly curved recess to receive a plow foot to prevent its lateral play; means for adjustably affixing wing sweeps to the band, means for rigidly locking said sweeps thereto and means for marking the angle on each side of the band to which the sweeps are to be set.

2. A wing sweep attachment for plows comprising a circular hoof shaped band with an upwardly projecting tongue portion having an interior curved recess to receive a plow foot; and having an annular rib; a washer provided with spaced lugs on its outer surface adapted to receive the inner ends of the blades to lock the blades at a desired angle; said lugs having a straight surfaced portion adapted to be supported on the same plane with the rib upon said rib; means for securing the washers to the band, and means for marking the angle on each side of the band to which the blades are to be set.

3. In a wing sweep attachment for plows, an annular band with an upwardly projecting tongue portion, a curved interior recess in the tongue to receive a plow foot; an annular rib on the band for supporting a washer with spaced lugs; a corrugated washer adapted to engage the interior of the band, both washers carried on a bolt; wing sweeps having double cutting edges, the inner ends of the sweeps being receivable between the lugs to lock the blades at desired angles and marker notches on the band to assist in procuring uniform setting of the blades on both sides of the band.

In testimony whereof I have signed my name to this specification.

M. T. SKINNER.